(12) United States Patent
Hoang et al.

(10) Patent No.: US 7,531,602 B2
(45) Date of Patent: May 12, 2009

(54) POLYMER BLENDS

(75) Inventors: Peter Phung Minh Hoang, Calgary (CA); Cliff Robert Baar, Calgary (CA)

(73) Assignee: Nova Chemicals (International) S.A. (CH)

( * ) Notice: Subject to any disclaimer, the term of this patent is extended or adjusted under 35 U.S.C. 154(b) by 270 days.

(21) Appl. No.: 11/244,351

(22) Filed: Oct. 5, 2005

(65) Prior Publication Data

US 2007/0078225 A1    Apr. 5, 2007

(51) Int. Cl.
C08L 23/04    (2006.01)

(52) U.S. Cl. ............... 525/240; 428/34.1; 526/172; 526/73; 526/113; 526/114; 526/118; 526/119; 502/152; 502/155; 502/167

(58) Field of Classification Search ............... 525/240; 526/172, 73, 113, 114, 118, 119; 428/34.1; 502/152, 155, 167
See application file for complete search history.

(56) References Cited

U.S. PATENT DOCUMENTS

| | | | |
|---|---|---|---|
| 4,530,914 A | 7/1985 | Ewen et al. | 502/113 |
| 4,719,193 A | 1/1988 | Levine et al. | 502/107 |
| 5,434,116 A | 7/1995 | Sone et al. | 502/103 |
| 5,554,775 A | 9/1996 | Krishnamurti et al. | 556/7 |
| 5,637,659 A | 6/1997 | Krishnamurti et al. | 526/133 |
| 5,783,512 A | 7/1998 | Jacobsen et al. | 502/124 |
| 5,834,393 A | 11/1998 | Jacobsen et al. | 502/152 |
| 6,087,293 A | 7/2000 | Carnahan et al. | 502/158 |
| 6,309,997 B1 | 10/2001 | Fujita et al. | 502/167 |
| 6,346,575 B1 | 2/2002 | Debras et al. | 525/191 |
| 7,064,096 B1 * | 6/2006 | Hoang et al. | 502/103 |
| 7,321,015 B2 * | 1/2008 | Hoang et al. | 526/73 |
| 2002/0077431 A1 | 6/2002 | Whiteker | 526/113 |

OTHER PUBLICATIONS

Corwin Hansch et al., A Survey of Hammett Substituent Constants and Resonance and Field Perameters, Chem Rev. 1991. 91, 165-195; 1991 American Chemical Society.
Peri et al., The Surface Structure of Silica Gel, J. Phys. Chem 72(8) 2926, 1968.
Noshay, A. et al., Transition Metal Catalyzed Polymerizations, pp. 396-416, Cambridge University Press, 1988.

* cited by examiner

Primary Examiner—Robert D. Harlan
(74) Attorney, Agent, or Firm—Kenneth H. Johnson

(57) ABSTRACT

A blend of polymers comprising from 5 to 95 weight % of a polymer having a high molecular weight made using a single site type catalyst and from 95 to 5 weight % of a polymer having a lower molecular weight made using a catalyst containing a phenoxide, preferably a salicylaldimine ligand, has an excellent toughness and would be suitable for use in applications such as polyolefin pipes.

13 Claims, 2 Drawing Sheets

POLYMER BLENDS

FIELD OF THE INVENTION

The present invention relates to blends of polymers one of which is made using a single site type catalyst (e.g. representative catalysts containing at least one cyclopentadienyl ligand) and the other of which is made by a catalyst containing a phenoxy, preferably a salicylaldimine, ligand. The polymer made using the single site type catalyst provides a higher molecular weight polymer component and the polymer made using the phenoxy ligand containing catalyst provides a lower molecular weight component. The copolymer incorporation in either component or the resulting blend may be normal (e.g. more comonomer in the lower molecular weight component) or reverse (e.g. more comonomer in the higher molecular weight component) or uniform.

BACKGROUND OF THE INVENTION

The original single site catalysts of the mid 1980's, such as a metallocene catalyst, produced resin having a narrow polydispersity (Mw/Mn) typically in the range from about 2.5 to 3.5. Early on it was recognized that blending such resins could produce bimodal resins, each component having a narrow polydispersity and the blend having a broader polydispersity. It was felt such resins would provide a good balance of processability and physical properties such as resin toughness. There are an increasing number of patents and applications in this field.

U.S. Pat. No. 4,530,914 issued Jul. 23, 1985 to Ewen et al., assigned to EXXON Research & Engineering Co. teaches the use in the same reactor of two metallocene catalysts each having different propagation and termination rate constants for ethylene polymerizations. The patent does not teach the polymers prepared in the presence of a phenoxide ligand containing catalyst of the present invention.

U.S. Pat. No. 6,346,575, issued Feb. 12, 2002 to Debras et al., assigned to Fina Research S.A. teaches a method to make a bimodal blended polymer by polymerizing monomers in a first reactor in the presence of a metallocene type catalyst and them moving the resulting polymer to a second reactor and polymerizing additional monomer in the prior formed polymer. The patent does not teach using a catalyst having a phenoxide ligand as required in the present patent. Further the patent teaches away from physical blending as required by the present invention.

U.S. Pat. No. 6,309,997 issued Oct. 30, 2001 teaches an olefin polymerization catalyst using a phenoxide (preferably a salicylaldimine) ligand for use in the polymerization of olefins. The patent does not teach blending such resins with a resin made using a single site catalyst (representative catalysts contain at least one cyclopentadienyl type ligand).

U.S. patent application 2002/0077431 published Jun. 20, 2002 in the name of Whiteker discloses a process for the polymerization and oligomerization of olefins in the presence of a mixed catalyst system in a single reactor. The catalyst system as disclosed comprises a first component similar to the catalyst containing the phenoxide component of the present invention except that at least one of substituents $R^3$, $R^4$, $R^5$, $R^8$, $R^9$ and $R^{10}$ must have a Hammett $\sigma_p$ value (Hansch et al., Chem Rev. 1991,91,165) greater than 0.2 (i.e. at least one of these substituents needs to be a sufficiently electron withdrawing group, (e.g. $CF_3$, Br, etc.)). In the present invention, in the catalyst containing the phenoxide ligand, all of $R^3$, $R^4$, $R^5$, $R^8$, $R^9$ and $R^{10}$ are hydrocarbyl substituents which have a Hammett value of less than 0.2. Furthermore, the reference teaches away from the blending approach of the present invention.

The present invention seeks to provide a polymer blend (physical blend) having good physical properties which would make it suitable for numerous applications including pipe applications.

SUMMARY OF THE INVENTION

The present invention provides a post reactor polyolefin blend comprising:

(a) from 5 to 95 weight % of a polymer having a weight average molecular weight greater than 5,000, typically from 10,000 to 140,000, preferably from about 15,000 to about 100,000, comprising from 80 to 100 weight % of ethylene and from 20 to 0 weight % of one or more $C_{3-8}$ alpha olefins which are unsubstituted or substituted by up to two $C_{1-6}$ alkyl radicals, having a density greater than 0.930, preferably from 0.940 to 0.965 g/cm³, said copolymer being prepared in the presence of a supported catalyst of the formula:

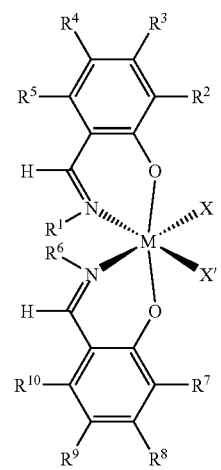

wherein M is a group 4 transition metal; $R^1$ and $R^6$ are independently selected from the group consisting of $C_{1-6}$ alkyl or $C_{6-10}$ aryl radicals; $R^2$ and $R^7$ are independently selected from the group consisting of $C_{3-5}$ secondary or tertiary alkyl radicals; $R^3$, $R^4$, $R^5$, $R^8$, $R^9$ and $R^{10}$ are independently selected from the group consisting of a hydrogen atom, $C_{1-4}$ alkyl radicals, $C_{6-10}$ aryl radicals, $C_1$-$C_4$ alkoxy radicals which substituents have a Hammett $\sigma_p$ value of less than 0.2; and X and X' are selected from the group consisting of a halogen atom, $C_{1-4}$ alkyl radicals, $C_{7-12}$ arylalkyl radicals, $C_{6-10}$ phenoxy radicals, amido radicals which may be substituted by up to two $C_{1-4}$ alkyl radicals and $C_{1-4}$ alkoxy radicals, and an activator; and (b) from 95 to 5 weight % of a polymer having a weight average molecular weight greater than 100,000, preferably from 140,000 to 1,000,000, most preferably from 140,000 to 600,000, comprising from 60 to 100 weight % of ethylene and from 40 to 0 weight % of one or more $C_{3-8}$ alpha olefins which are unsubstituted or substituted by up to two $C_{1-6}$ alkyl radicals, having a density from 0.890 to 0.950, preferably from 0.910 to 0.940 g/cm³, said copolymer being prepared in the presence of a supported catalyst of the formula:

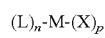

wherein M is a group 4 metal; L is a monoanionic ligand, independently selected from the group consisting of a cyclopentadienyl-type ligand, a bulky heteroatom ligand and a phosphinimine ligand; X is an activatable ligand; n may be from 1 to 3; and p may be from 1 to 3, provided that the sum of n+p equals the valence state of M, and further provided that two L ligands may be bridged by a silyl radical or a $C_{1-4}$ alkyl radical and an activator.

Components (a) and (b) may be prepared by any process including a continuous fluidized bed gas phase polymerization at a temperature from 50 to 120° C.; slurry polymerization and solution polymerization at temperatures from 180° C. to 300° C.

DETAILED DESCRIPTION

Figure 1:
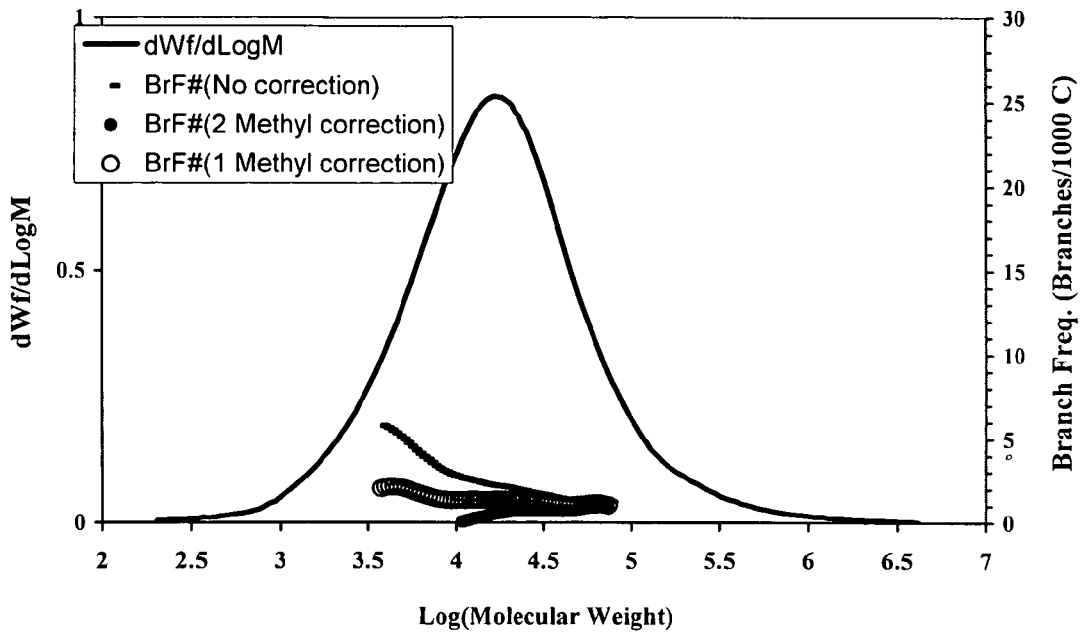
FIG. 1 shows the GPC-FTIR profile of the polymer produced in an example using a catalyst containing a phenoxide ligand.

As used in this specification the following words or phrases have the following meanings:

Polydispersity (PD) is the ratio of the weight average molecular weight (as determined by gel permeation chromatography (GPC)) to the number average molecular weight (as determined by GPC) (i.e. Mw/Mn) of any component in the bimodal resin or the bimodal resin per se.

The term "cyclopentadienyl" refers to a 5-member carbon ring having delocalized bonding within the ring and typically being bound to the active catalyst site, generally a group 4 metal (M) through $\eta^5$-bonds.

Gas phase polymerization of olefins and particularly alpha olefins has been known for at least about 30 years. Generally a gaseous mixture comprising from 0 to 15 mole % of hydrogen, from 0 to 30 mole % of one or more $C_{3-8}$ alpha olefins, from 15 to 100 mole % of ethylene, and from 0 to 75 mole % of nitrogen and/or a non-polymerizable hydrocarbon at a temperature from 50° C. to 120° C., preferably from 60° C. to 120° C., most preferably from 75° C. to about 110° C., and at pressures typically not exceeding 3,500 KPa (about 500 psi), preferably not greater than 2,400 KPa (about 350 psi) are polymerized in the presence of a supported catalyst system in a single reactor.

Slurry polymerization is well known in the art. The polymerization is conducted in an inert diluent in which the resulting polymer is not soluble. The monomers may be soluble in the diluent. The diluent is typically a hydrocarbyl compound such as a $C_{4-12}$ hydrocarbon which may be unsubstituted or substituted by a $C_{1-4}$ alkyl radical. Preferably the diluent is unsubstituted. Some potential diluents include pentane, hexane, heptane, octane, cyclohexane, and methylcyclohexane. The diluent may be hydrogenated naphtha. The diluent may also be a $C_{8-12}$ aromatic hydrocarbon such as that sold by Exxon Chemical Company under the trademark ISOPAR® E.

Generally in a slurry phase polymerization the monomers are dispersed or dissolved in the diluent. The reaction takes place at temperatures from about 20° C. to about 120° C., preferably from about 40° C. to 100° C., desirably from 50° C. to 95° C. The pressure in the reactor may be from about 103.4 KPa (15 psi) to about $3.102 \times 10^4$ KPa (4,500 psi), preferably from about $6.894 \times 10^2$ KPa (100 psi) to $1.034 \times 10^4$ KPa (1,500 psi). The reactors may be "loop" reactors with a settling leg to remove polymer.

The polymerization may be a solution polymerization at temperatures from about 180° C. to about 300° C., preferably from about 180° C. to 250° C., most preferably from about 180° C. to 220° C. at pressures from about 4 MPa (about 580 psi) to about 20 MPa (about 3,000 psi). In a solution polymerization the monomers are dissolved in a solvent and the resulting polymer remains soluble in the solvent. The solvent may be the same or similar to the diluents used in a slurry polymerization but the polymer remains in solution at the polymerization temperature.

Suitable olefin monomers for the above polymerization processes may be ethylene and $C_{3-10}$ mono- and di-olefins. Preferred monomers include ethylene and $C_{3-8}$ alpha olefins which are unsubstituted or substituted by up to two $C_{1-6}$ alkyl radicals. Illustrative non-limiting examples of such alpha olefins are one or more of propylene, 1-butene, 1-hexene and 1-octene.

The low molecular weight polymer may comprise from 80 to 100, preferably from 90 to 100 weight % of ethylene and from 20 to 0.0, preferably from 10 to 0.0 weight % of one or more $C_{3-8}$ alpha olefins which are unsubstituted or substituted by up to two $C_{1-6}$ alkyl radicals. The high molecular weight polymer may comprise from 60 to 100, preferably from 80 to 99.9 weight % of ethylene and from 40 to 0.0, preferably from 20 to 0.1 weight % of one or more $C_{3-8}$ alpha olefins which are unsubstituted or substituted by up to two $C_{1-6}$ alkyl radicals. The high molecular weight polymer may have a low density (e.g. from 0.890 to 0.950, preferably from 0.910 to 0.940 g/cm$^3$) and a weight average molecular weight greater than 100,000, preferably from 140,000 to 10$^6$. The low molecular weight polymer (typically made using the phenoxide ligand containing catalyst) may have a density greater than 0.930 g/cm$^3$, preferably from 0.940 to 0.965 g/cm$^3$ and a weight average molecular weight greater than 5,000, typically from 10,000 to 140,000, preferably from about 15,000 to about 100,000.

The individual components of the blend of the present invention may be prepared by the same or different conventional polymerization processes as noted above. The individual polymer components may be blended in any convenient manner such as dry blending (e.g. tumble blending), extrusion blending, solution blending and similar blending techniques known to those skilled in the art.

The polymer blends prepared in accordance with the present invention have a broad, bimodal or multimodal molecular weight distribution. Overall, the weight average molecular weight (Mw) of the blend will preferably be greater than about 30,000 ranging up to 10$^7$, preferably 10$^5$ to 10$^6$. The polymer blend may have a density as low as 0.912 g/cc and as high as 0.965 g/cc. Preferably, the polymer blend will have a density from 0.915 g/cc to 0.960 g/cm$^3$. Generally, the lower molecular weight polymer will be present in the blend in an amount from 5 to 95, preferably from 30 to 70, most preferably from 35 to 65 weight % of the total polymer blend. The high molecular weight polymer may be present in the blend in amounts from 95 to 5, preferably 70 to 30, most preferably from about 65 to 35 weight % of the total polymer.

The low molecular weight polyethylene may have a weight average molecular weight greater than 5,000, typically from 10,000 to 140,000, preferably from about 15,000 to about 100,000 as determined using a GPC curve. The low molecular weight polyethylene may have a polydispersity (Mw/Mn) greater than about 3 typically from 3 to 15, preferably from about 5 to 12.

The high molecular weight polyethylene may have a weight average molecular weight greater than 100,000, typically from 140,000 to $10^6$, preferably from about 140,000 to about 600,000 as determined using a GPC. The high molecular weight polyethylene may have a polydispersity (Mw/Mn) less than about 10, typically from 2 to 8.

The resin blends will be at least broad or bimodal. The blends may have a polydispersity from about 3 to about 30, typically from about 5 to 15.

The resin blends of the present invention are suitable for use in a number of applications including for example film (blown and cast), extruded articles such as pipe (for potable water or for gas), rotomolded articles, injection molded articles and blow molded articles.

The catalyst system for each component of the blend of the present invention may be supported on an inorganic or refractory support, including for example alumina, silica, clays or modified clays; or an organic support (including polymeric support such as polystyrene or cross-linked polystyrene). Some refractories include silica which may be treated to reduce surface hydroxyl groups and alumina. The support or carrier may be a spray-dried silica. Generally the support will have an average particle size from about 0.1 to about 1,000, preferably from about 10 to 150 microns. The support typically will have a surface area of at least about 10 m²g, preferably from about 150 to 1,500 m²g. The pore volume of the support should be at least 0.2, preferably from about 0.3 to 5.0 ml/g.

Generally the refractory or inorganic support may be heated at a temperature of at least 200° C. for up to 24 hours, typically at a temperature from 500° C. to 800° C. for about 2 to 20, preferably 4 to 10 hours. The resulting support will be essentially free of adsorbed water (e.g. less than about 1 weight %) and may have a surface hydroxyl content from about 0.1 to 5 mmol/g of support, preferably from 0.5 to 3 mmol/g.

A silica suitable to prepare the component polymers of the present invention has a high surface area and is amorphous. For example, commercially available silicas are marketed under the trademark of Sylopol® 958 and 955 by the Davison Catalysts, a Division of W.R. Grace and Company and ES-70W by Ineos Silica.

The amount of the hydroxyl groups in silica may be determined according to the method disclosed by J. B. Peri and A. L. Hensley, Jr., in *J. Phys. Chem.*, 72 (8), 2926, 1968, the entire contents of which are incorporated herein by reference.

While heating is the most preferred means of removing OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound (e.g. triethyl aluminum) or a silane compound. This method of treatment has been disclosed in the literature and two relevant examples are: U.S. Pat. No. 4,719,193 to Levine in 1988 and by Noshay A. and Karol F. J. in *Transition Metal Catalyzed Polymerizations*, Ed. R. Quirk, 396, 1989. For example the support may be treated with an aluminum compound of the formula $Al((O)_a R^1)_b X_{3-b}$ wherein a is either 0 or 1, b is an integer from 0 to 3, $R^1$ is a $C_{1-8}$ alkyl radical, and X is a chlorine atom. The amount of aluminum compound is such that the amount of aluminum on the support prior to adding the remaining catalyst components will be from about 0 to 2.5 weight %, preferably from 0 to 2.0 weight % based on the weight of the support.

The clay type supports are also preferably treated to reduce adsorbed water and surface hydroxyl groups. The clays may be further subjected to an ion exchange process which may tend to increase the separation or distance between the adjacent layers of the clay structure.

The polymeric support may be cross linked polystyrene containing up to about 50 weight %, preferably not more than 25 weight %, most preferably less than 10 weight % of a cross linking agent such as divinyl benzene.

In accordance with the present invention the catalyst for the first polymer component of the blend comprises a catalyst of the formula I:

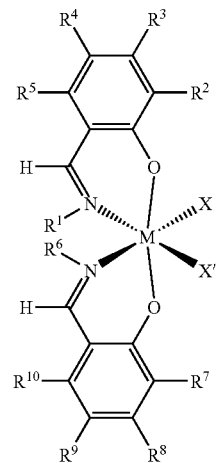

wherein M is a group 4 transition metal, preferably Zr or Ti; $R^1$ and $R^6$ are independently selected from the group consisting of $C_{1-6}$ alkyl or $C_{6-10}$ aryl radicals, preferably cyclohexyl radicals; $R^2$ and $R^7$ are independently selected from the group consisting of $C_{3-5}$ secondary or tertiary alkyl radicals, preferably t-butyl radicals; $R^3$, $R^4$, $R^5$, $R^8$, $R^9$ and $R^{10}$ are independently selected from the group consisting of a hydrogen atom, $C_{1-4}$ alkyl radicals, $C_{6-10}$ aryl radicals, $C_1$-$C_4$ alkoxy radicals, which substituents have a Hammett $\sigma_p$ value of less than 0.2; and X and X' are selected from the group consisting of a halogen atom, $C_{1-4}$ alkyl radicals, $C_{7-12}$ arylalkyl radicals, $C_{6-10}$ phenoxy radicals, amido radicals which may be substituted by up to two $C_{1-4}$ alkyl radicals and $C_{1-4}$ alkoxy radicals; preferably, a chlorine atom, a methyl radical, an ethyl radical and a benzyl radical.

In the catalyst for the first polymer component of the blend of the present invention, preferably $R^4$ and $R^9$ are selected from the group consisting of a $C_1$-$C_4$ alkoxy radical, most preferably methoxy radicals and $R^3$, $R^5$, $R^8$ and $R^{10}$ are hydrogen.

As noted above none of $R^3$, $R^4$, $R^5$, $R^8$, $R^9$ and $R^{10}$ has a Hammett $\sigma_p$ value (Hansch et al., Chem Rev. 1991, 91, 165) greater than 0.2.

The synthesis of desired ligands of the first catalyst can be accomplished by reaction of salicylaldehydes with amines. Preparation of the requisite salicylaldehydes can be accomplished using standard synthetic techniques.

Metallation of the ligands can be accomplished by reaction with basic reagents for example $Zr(CH_2Ph)_4$. Reaction of the ligands with $Zr(CH_2Ph)_4$ occurs with elimination of toluene.

Alternately, ligands can be deprotonated with reagents such as BuLi, KH or Na metal and then reacted with metal halides, for example ZrCl₄.

The catalyst for the second polymeric component of the blend of the present invention (second catalyst) is a bulky ligand single site catalyst of the formula II:

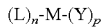

wherein M is selected from the group consisting of Ti, Zr, and Hf; L is a monoanionic ligand independently selected from the group consisting of cyclopentadienyl-type ligands, and a bulky heteroatom ligand containing not less than five atoms in total (typically of which at least 20%, preferably at least 25% numerically are carbon atoms) and further containing at least one heteroatom selected from the group consisting of boron, nitrogen, oxygen, phosphorus, sulfur and silicon, said bulky heteroatom ligand being sigma or pi-bonded to M, Y is independently selected for the group consisting of activatable ligands; n may be from 1 to 3; and p may be from 1 to 3, provided that the sum of n+p equals the valence state of M, and further provided that two L ligands may be bridged.

Non-limiting examples of bridging group include bridging groups containing at least one Group 13 to 16 atom, often referred to a divalent moiety such as but not limited to at least one of a carbon, oxygen, nitrogen, silicon, boron, germanium and tin atom or a combination thereof. Preferably the bridging group contains a carbon, silicon or germanium atom, most preferably at least one silicon atom or at least one carbon atom. The bridging group may also contain substituent radicals as defined above including halogens.

Some bridging groups include but are not limited to a di $C_{1-6}$ alkyl radical (e.g. alkylene radical for example an ethylene bridge), di $C_{6-10}$ aryl radical (e.g. a benzyl radical having two bonding positions available), silicon or germanium radicals substituted by one or more radicals selected from the group consisting of $C_{1-6}$ alkyl, $C_{6-10}$ aryl, phosphine or amine radical which are unsubstituted or up to fully substituted by one or more $C_{1-6}$ alkyl or $C_{6-10}$ aryl radicals, or a hydrocarbyl radical such as a $C_{1-6}$ alkyl radical or a $C_{6-10}$ arylene (e.g. divalent aryl radicals); divalent $C_{1-6}$ alkoxide radicals (e.g. —CH₂CHOHCH₂—) and the like.

Exemplary of the silyl species of bridging groups are dimethylsilyl, methylphenylsilyl, diethylsilyl, ethylphenylsilyl or diphenylsilyl compounds. Most preferred of the bridged species are dimethylsilyl, diethylsilyl and methylphenylsilyl bridged compounds.

Exemplary hydrocarbyl radicals for bridging groups include methylene, ethylene, propylene, butylene, phenylene and the like, with methylene being preferred.

Exemplary bridging amides include dimethylamide, diethylamide, methylethylamide, di-t-butylamide, diisoproylamide and the like.

The term "cyclopentadienyl" refers to a 5-member carbon ring having delocalized bonding within the ring and typically being bound to the active catalyst site, generally a group 4 metal (M) through η⁵-bonds. The cyclopentadienyl ligand may be unsubstituted or up to fully substituted with one or more substituents selected from the group consisting of $C_{1-10}$ hydrocarbyl radicals in which hydrocarbyl substituents are unsubstituted or further substituted by one or more substituents selected from the group consisting of a halogen atom and a $C_{1-4}$ alkyl radical; a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—(R)₃ wherein each R is independently selected from the group consisting of hydrogen, a $C_{1-8}$ alkyl or alkoxy radical, and $C_{6-10}$ aryl or aryloxy radicals; and germanyl radicals of the formula Ge—(R)₃ wherein R is as defined above.

Typically the cyclopentadienyl-type ligand is selected from the group consisting of a cyclopentadienyl radical, an indenyl radical and a fluorenyl radical where the radicals are unsubstituted or up to fully substituted by one or more substituents selected from the group consisting of a fluorine atom, a chlorine atom; $C_{1-4}$ alkyl radicals; and a phenyl or benzyl radical which is unsubstituted or substituted by one or more fluorine atoms.

In the formula of the catalyst used for the second polymer component above, if none of the L ligands is bulky heteroatom ligand then the catalyst could be a bis Cp catalyst (a traditional metallocene) or a bridged constrained geometry type catalyst or tris Cp catalyst.

If the catalyst used to make the second polymer component of the blends of the present invention contains one or more bulky heteroatom ligands the catalyst would have the formula:

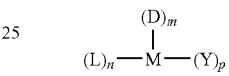

wherein M is a transition metal selected from the group consisting of Ti, Hf and Zr; D is independently a bulky heteroatom ligand (as described below); L is a monoanionic ligand selected from the group consisting of cyclopentadienyl-type ligands; Y is independently selected from the group consisting of activatable ligands; m is 1 or 2; n is 0, 1 or 2 and p is an integer and the sum of m+n+p equals the valence state of M, provided that when m is 2, D may be the same or different bulky heteroatom ligands.

For example, the catalyst may be a bis (phosphinimine), or a mixed phosphinimine ketimide dichloride complex of titanium, zirconium or hafnium. Alternately, the catalyst could contain one phosphinimine ligand or one ketimide ligand, one "L" ligand (which is most preferably a cyclopentadienyl-type ligand) and two "Y" ligands (which are preferably both chloride).

In the catalyst used to make the second polymer component of the blends of the present invention, the preferred metals (M) are from Group 4 (especially titanium, hafnium or zirconium) with titanium being most preferred. In one embodiment the catalysts are group 4 metal complexes in the highest oxidation state.

In the catalyst used to make the second polymer component of the present invention, bulky heteroatom ligands (D) include but are not limited to phosphinimine ligands (PI) and ketimide (ketimine) ligands.

The phosphinimine ligand (PI) is defined by the formula:

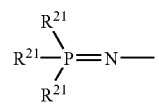

wherein each $R^{21}$ is independently selected from the group consisting of a hydrogen atom; a halogen atom; $C_{1-20}$, preferably $C_{1-10}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula:

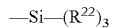

wherein each $R^{22}$ is independently selected from the group consisting of hydrogen, a $C_{1-8}$ alkyl or alkoxy radical, and $C_{6-10}$ aryl or aryloxy radicals; and a germanyl radical of the formula:

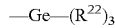

wherein $R^{22}$ is as defined above.

The preferred phosphinimines are those in which each $R^{21}$ is a hydrocarbyl radical, preferably a $C_{1-6}$ hydrocarbyl radical.

Suitable phosphinimine catalysts are Group 4 organometallic complexes which contain one phosphinimine ligand (as described above) and one ligand L which is either a cyclopentadienyl-type ligand or a heteroatom ligand.

As used herein, the term "ketimide ligand" refers to a ligand which:

(a) is bonded to the transition metal via a metal-nitrogen atom bond;

(b) has a single substituent on the nitrogen atom (where this single substituent is a carbon atom which is doubly bonded to the N atom); and (c) has two substituents Sub 1 and Sub 2 (described below) which are bonded to the carbon atom.

Conditions a, b and c are illustrated below:

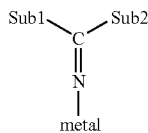

The substituents "Sub 1" and "Sub 2" may be the same or different and may be further bonded together through a bridging group to form a ring. Exemplary substituents include hydrocarbyls having from 1 to 20, preferably from 3 to 6, carbon atoms, silyl groups (as described below), amido groups (as described below) and phosphido groups (as described below). For reasons of cost and convenience it is preferred that these substituents both be hydrocarbyls, especially simple alkyls and most preferably tertiary butyl.

Suitable ketimide catalysts for the second polymer used in the blends of the present invention are Group 4 organometallic complexes which contain one ketimide ligand (as described above) and one ligand L which is either a cyclopentadienyl-type ligand or a heteroatom ligand.

The term bulky heteroatom ligand (D) is not limited to phosphinimine or ketimide ligands and includes ligands which contains at least one heteroatom selected from the group consisting of boron, nitrogen, oxygen, phosphorus, sulfur and silicon. The heteroatom ligand may be sigma or pi-bonded to the metal. Exemplary heteroatom ligands include silicon-containing heteroatom ligands, amido ligands, alkoxy ligands, boron heterocyclic ligands and phosphole ligands, as all described below.

Silicon containing heteroatom ligands are defined by the formula:

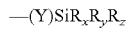

wherein the — denotes a bond to the transition metal and Y is sulfur or oxygen.

The substituents on the Si atom, namely $R_x$, $R_y$ and $R_z$ are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond; and (b) the presence of two substituents (which are typically simple alkyl or silyl groups) on the nitrogen atom.

The terms "alkoxy" and "aryloxy" is also intended to convey its conventional meaning. Thus, these ligands are characterized by (a) a metal oxygen bond; and (b) the presence of a hydrocarbyl group bonded to the oxygen atom. The hydrocarbyl group may be a $C_{1-10}$ straight chained, branched or cyclic alkyl radical or a $C_{6-13}$ aromatic radical which radicals are unsubstituted or further substituted by one or more $C_{1-4}$ alkyl radicals (e.g. 2,6 di-tertiary butyl phenoxy).

Boron heterocyclic ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659; 5,554,775; and the references cited therein).

The term "phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization and are described as such in U.S. Pat. No. 5,434,116 (Sone, to Tosoh).

In one embodiment the catalyst used to prepare the second polymer used in the blends of the present invention may contain no phosphinimine ligands as the bulky heteroatom ligand. The bulky heteroatom containing ligand may be selected from the group consisting of ketimide ligands, silicon-containing heteroatom ligands, amido ligands, alkoxy ligands, boron heterocyclic ligands and phosphole ligands. In such catalysts, the Cp ligand may be present or absent. The preferred metals in the catalyst used to make the second polymer used in the blends of the present invention (M) are selected from Group 4 (especially titanium, hafnium or zirconium), with titanium being most preferred.

Each of the catalyst systems (e.g. the catalyst used to prepare the first and second polymer components used in the blends of the present invention) may be activated with an activator selected from the group consisting of:

(i) a complex aluminum compound of the formula $R^{12}_2AlO(R^{12}AlO)_mAlR^{12}_2$ wherein each $R^{12}$ is independently selected from the group consisting of $C_{1-20}$ hydrocarbyl radicals and m is from 3 to 50, and optionally a hindered phenol to provide a molar ratio of Al:hindered phenol from 2:1 to 5:1 if the hindered phenol is present;

(ii) ionic activators selected from the group consisting of:
(A) compounds of the formula $[R^{13}]^+[B(R^{14})_4]^-$ wherein B is a boron atom, $R^{13}$ is a cyclic $C_{5-7}$ aromatic cation or a triphenyl methyl cation and each $R^{14}$ is independently selected from the group consisting of phenyl radicals which are unsubstituted or substituted with a hydroxyl group or 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^{15})_3$; wherein each $R^{15}$ is independently selected from the group consisting of a hydrogen atom and a $C_{1-4}$ alkyl radical; and (B) compounds of the formula $[(R^{18})_tZH]^+[B(R^{14})_4]^-$ wherein B is a boron atom, H is a hydrogen atom, Z is a nitrogen atom or phosphorus atom, t is 2 or 3 and $R^{18}$ is independently selected from the group consisting of $C_{1-18}$ alkyl radicals, a phenyl radical which is unsubstituted or substituted by up to three $C_{1-4}$ alkyl radicals, or one $R^{18}$ taken together with the nitrogen atom may form an anilinium radical and $R^{14}$ is as defined above; and (C) compounds of the formula $B(R^{14})_3$ wherein $R^{14}$ is as defined above; and (iii) mixtures of (i) and (ii).

Preferably the activator is a complex aluminum compound of the formula $R^{12}{}_2AlO(R^{12}AlO)_mAlR^{12}{}_2$ wherein each $R^{12}$ is independently selected from the group consisting of $C_{1-4}$ hydrocarbyl radicals and m is from 3 to 50, and optionally a hindered phenol to provide a molar ratio of Al:hindered phenol from 2:1 to 5:1 if the hindered phenol is present. In the aluminum compound, preferably $R^{12}$ is methyl radical and m is from 10 to 40. The preferred molar ratio of Al:hindered phenol, if it is present, is from 3.25:1 to 4.50:1. Preferably the phenol is substituted in the 2, 4 and 6 position by a $C_{2-6}$ alkyl radical. Desirably the hindered phenol is 2,6-di-tert-butyl-4-ethyl-phenol.

The aluminum compounds (alumoxanes and optionally hindered phenol) are typically used as activators in substantial molar excess compared to the amount of the transition metal in the catalyst. Aluminum:transition metal molar ratios of from 10:1 to 10,000:1 are preferred, most preferably 10:1 to 500:1 especially from 10:1 to 120:1.

Ionic activators are well known to those skilled in the art. The "ionic activator" may abstract one activatable ligand so as to ionize the catalyst center into a cation, but not to covalently bond with the catalyst and to provide sufficient distance between the catalyst and the ionizing activator to permit a polymerizable olefin to enter the resulting active site.

Examples of ionic activators include:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
tropillium phenyltrispentafluorophenyl borate,
triphenylmethylium phenyltrispentafluorophenyl borate,
benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
tropillium tetrakis (3,4,5-trifluorophenyl) borate,
benzene (diazonium) tetrakis (3,4,5-trifluorophenyl) borate,
tropillium tetrakis (1,2,2-trifluoroethenyl) borate,
triphenylmethylium tetrakis (1,2,2-trifluoroethenyl) borate,
tropillium tetrakis (2,3,4,5-tetrafluorophenyl) borate, and
triphenylmethylium tetrakis (2,3,4,5-tetrafluorophenyl) borate.

Readily commercially available ionic activators include: N,N-dimethylaniliniumtetrakispentafluorophenyl borate; triphenylmethylium tetrakispentafluorophenyl borate (tritylborate); and trispentafluorophenyl borane.

Ionic activators may also have an anion containing at least one group comprising an active hydrogen or at least one of any substituent able to react with the support. As a result of these reactive substituents, the ionic portion of these ionic activators may become bonded to the support under suitable conditions. One non-limiting example includes ionic activators with tris (pentafluorophenyl) (4-hydroxyphenyl) borate as the anion. These tethered ionic activators are more fully described in U.S. Pat. Nos. 5,834,393; 5,783,512; and 6,087,293.

Suitable linking substituents, E, on compatible anions used with unmodified inorganic oxides or with inorganic oxide containing only residual hydroxyl functionality, include moieties bearing silane, siloxane, hydrocarbyloxysilane, halosilane, amino, carboxylic acid, carboxylic acid ester, aldehyde, ketone or epoxide functionality, containing from 1 to $1 \times 10^6$ nonhydrogen atoms, more preferably from 2 to 1,000 nonhydrogen atoms, and most preferably 4 to 20 nonhydrogen atoms. In practice, use of silane containing compatible anions may require use of a base catalyst, such as a tri($C_{1-4}$ alkyl) amine, to effect the reaction with a substrate containing only residual hydroxyl functionality. Preferably E for use with such unmodified inorganic oxide compounds is a silane or chlorosilane substituted hydrocarbyl radical. Preferred linking substituents, E, include silyl-substituted aryl, silyl-substituted alkylaryl, silyl-substituted arylalky, silyl-substituted alkyl, silyl-substituted haloaryl, or silyl-substituted haloalkyl groups, including polymeric linking groups, most preferably p-silylphenyl (—$C_6H_4SiH_3$), p-silyltetrafluorophenyl (—$C_6F_4SiH_3$), silylnaphthyl (—$C_{10}H_8SiH_3$), silylperfluoronaphthyl (—$C_{10}F_8SiH_3$), and 2-silyl-1-ethyl(—$C_2H_4SiH_3$), groups.

Suitable linking substituents, E, on compatible anions used with inorganic oxides that have been modified with reactive silane functionality include moieties bearing silane, siloxane, hydrocarbyloxysilane, halosilane, hydroxyl, thiol, amino, carboxylic acid, carboxylic acid ester, aldehyde, ketone or epoxide functionality containing from 1 to $1 \times 10^6$ nonhydrogen atoms, more preferably from 2 to 1000 nonhydrogen atoms, and most preferably 4 to 20 nonhydrogen atoms. Preferably E, in such circumstances is a hydroxyl substituted hydrocarbyl radical, more preferably a hydroxy-substituted aryl, hydroxy-substituted alkylaryl, hydroxy-substituted arylalkyl, hydroxy-substituted alkyl, hydroxy-substituted haloaryl, or hydroxy-substituted haloalkyl group including polymeric linking groups, most preferably hydroxyphenyl, hydroxytolyl, hydroxybenzyl, hydroxynaphthyl, hydroxybisphenyl, hydroxycyclohexyl, $C_{1-4}$ hydroxyalkyl, and hydroxy-polystyryl groups, or fluorinated derivatives thereof. A most preferred linking substituent, E, is a p-hydroxyphenyl, 4-hydroxybenzyl, 6-hydroxy-2-naphthyl group, 4-(4'- hydroxyphenyl)phenyl, 4-((4'-hydroxyphenyl)dimethylmethylene)phenyl, or fluorinated derivatives thereof. A base catalyst, such as a tri($C_{1-4}$ alkyl)amine, may also be used to assist in the reaction with the substrate.

Most highly preferably, E is one of the foregoing hydroxy substituted substituents used in combination with a reactive silane functionalized silica.

The ionic activators may be used in amounts to provide a molar ratio of transition metal to boron will be from 1:1 to 1:6, preferably from 1:1 to 1:2.

As noted above, the reaction mixture in a gas phase process typically comprises from 0 to 15 mole % of hydrogen, from 0 to 30 mole % of one or more $C_{3-8}$ alpha-olefins, from 15 to 100 mole % of ethylene, and from 0 to 75 mole % of one or more non-reactive gases. The non-reactive gases may be selected from the group consisting of nitrogen and a $C_{1-7}$ non polymerizable hydrocarbon such as an alkane (e.g. butane, isopentane and the like).

Depending on the polymerization process, the resin may be degassed and further treated, such as by the addition of conventional additives and process aids. As noted above the resin components may be blended using conventional methods.

The resulting resin blend may typically be further compounded either by the manufacturer or the converter (e.g. the company converting the resin pellets into the final product). Fillers, pigments and other additives may be added to the blend. Typically the fillers are inert additives such as clay, talc, $TiO_2$ and calcium carbonate which may be added to the polyolefin in amounts from 0 weight % up to about 50 weight %, preferably less than 30 weight % of the resin blend. Typical amounts of antioxidants and heat and light stabilizers such as combinations of hindered phenols and one or more of phosphates, phosphites and phosphonites may be added to the resin blend typically in amounts of less than 0.5 weight % based on the weight of the resin blend. Pigments such as carbon black may also be added to the resin blend in small amounts.

In the manufacture of pipe and other products, the polyethylene resin blend may contain a nucleating agent in amounts from about 1,500 to about 10,000 parts per million (ppm) based on the weight of the polyolefin. Preferably the nucleating agent is used in amounts from 2,000 to 8,000 ppm, most preferably from 2,000 to 5,000 ppm based on the weight of the polyolefin.

The nucleating agent may be selected from the group consisting of dibenzylidene sorbitol, di(p-methyl benzylidene) sorbitol, di(o-methyl benzylidene) sorbitol, di(p-ethylbenzylidene) sorbitol, bis(3,4-dimethyl benzylidene) sorbitol, bis(3,4-diethylbenzylidene) sorbitol and bis(trimethylbenzylidene) sorbitol. One commercially available nucleating agent is bis(3,4-dimethyl benzylidene) sorbitol.

The polymer blends of the present invention are useful in conventional applications for polyolefins including but not limited to films, both blown and cast, pipes, geomembranes, injection molding, blow molding and rotomolding.

For pipe applications, desirably the polymer blend should have the following characteristics:

ASTM D638: tensile stress at yield equal or greater than 23 MPa.

ASTM F2231-02: Charpy Impact test energy>0.6 J (With this property, the material should exhibit excellent Rapid Crack Propagation (RCP) resistance if tested according to ISO RCP tests 13477 (S4 RCP test) and 13478 (Full Scale RCP test)).

ASTM F1473: (Slow Crack Growth resistance test) PENT test at 2.4 MPa at 80° C.>1000 hours.

Hydrostatic properties:

ASTM D2837: HDB (Hydrostatic Design Basis) at 23° C. 1,600 psi, and meet the 50-years substantiation requirement according to PPI (Plastic Pipe Institute) TR-3 2004.

ASTM D2837: HDB (Hydrostatic Design Basis) at 60° C. 1,000 psi

ASTM D1598: no ductile and brittle failure at greater than 7,000 hours at both test conditions of hoop stress 740 psi/temperature 80° C., and hoop stress 690 psi/temperature 90° C. hydrostatic test at hoop With these hydrostatic test results, the blend would meet the PE100 requirements if it was tested according to the ISO standards ISO 12162 and ISO 9080.

The polymer blend could have an $I_{21}I_5$ from about 7 to 35. $I_{21}$ and $I_5$ are melt flow rates measured at 190° C. under 21.6 kg and 2.16 kg, respectively.

Processability: The blend should possesses excellent melt strength for production of large diameter pipes of 12 inches or larger with little or no sagging of the melt as it exits the die The polymer blend should have a melt strength of at least 10 cN determined using a Rosand Capillary Rheometer.

Test conditions:
Barrel Temperature: 230° C.
Die: 2-mm Diameter, L/D=20
Pressure Transducer: 10,000 psi (68.95 MPa)
Piston Speed: 5.33 mm/min
Haul-off Angle: 52°
Haul-off incremental speed: 500 m/(min)$^2$ For film products the blend should have the following properties as determined by the appropriate ASTM test method.

$I_{21}$ less than 25, typically from 5 to 20, preferably from 8 to 15 dg/min.

MD Tensile strength of from about 7,000 to about 18,000 typically 10,000 to 15,000 psi.

TD Tensile strength of from about 7,000 to about 18,000 typically, 10,000 to 15,000 psi.

MD Tensile elongation of from about 220 to about 350%.

TD Tensile elongation of from about 220 to about 350%.

MD Elmendorf Tear value of from about 10 to about 30 g/mil.

TD Elmendorf Tear value of from about 20 to about 60 g/mil.

Dart Impact ($F_{50}$) of greater than 150 g.

For molding (injection, blow and extrusion) the following mechanical properties (as measured by the appropriate ASTM test method) may be desirable in the blend.

| | |
|---|---|
| Yield Point | 25 to 40, preferably 25 to 35 MPa |
| Tensile Modulus | 800 to 1000, preferably 800 to 900 MPA |
| Tensile Strength | 20 to 45, preferably 25 to 40 MPa |
| Notch Impact | 140 to 160, typically about 150 kJ/M$^2$ |
| Flexural Strength | 20 to 45, preferably 20 to 40 MPa |
| Shear Strength | 20 to 45, preferably 20 to 36 MPa |
| Elongation at yield | 10 to 15 typically 10 to 12% |
| Elongation at break | 100 to 1200% |

The present invention will now be illustrated by the following non-limiting examples.

EXAMPLES

Experimental

In the experiments the following abbreviations were used.
THF=tetrahydrofuran
TMS=trimethyl silyl Molecular weight distribution and molecular weight averages (Mw, Mn, Mz) of resins were determined using high temperature Gel Permeation Chromatography (GPC) according to the ASTM D6474: "Standard Test Method for Determining Molecular Weight Distribution and Molecular Weight Averages of Polyolefins". The system was calibrated using the 16 polystyrene standards (Mw/Mn<1.1) in Mw range $5 \times 10^3$ to $8 \times 10^6$ and 3 Hydrocarbon Standards $C_{60}$, $C_{40}$, and $C_{20}$.

The operating conditions are listed below:

| | |
|---|---|
| GPC Instrument: | Polymer Laboratories ® 220 equipped with a refractive index detector |
| Software: | Viscotek ® DM 400 Data Manager with Trisec ® software |
| Columns: | 4 Shodex ® AT-800/S series cross-linked styrene-divinylbenzene with pore sizes $10^3$Å, $10^4$Å, $10^5$Å, $10^6$Å |
| Mobile Phase: | 1,2,4-trichlorobenzene |
| Temperature: | 140° C. |
| Flow Rate: | 1.0 ml/min |
| Sample Preparation: | Samples were dissolved in 1,2,4-trichlorobenzene by heating on a rotating wheel for four hours at 150° C. |
| Sample Filtration: | No |
| Sample Concentration: | 0.1% (w/v) |

The determination of branch frequency as a function of molecular weight was carried out using high temperature Gel Permeation Chromatography (GPC) and FT-IR of the eluent. Polyethylene standards with a known branch content, polystyrene and hydrocarbons with a known molecular weight were used for calibration.

Operating conditions are listed below:

| | |
|---|---|
| GPC instrument: | Waters ® 150 equipped with a refractive index detector |
| IR Instrument: | Nicolet Magna ® 750 with a Polymer Labs ® flow cell. |
| Software: | Omnic ® 5.1 FT-IR |
| Columns: | 4 Shodex ® AT-800/S series cross-linked styrene-divinylbenzene with pore sizes $10^3$Å, $10^4$Å, $10^5$Å, $10^6$Å |
| Mobile Phase: | 1,2,4-Trichlorobenzene |
| Temperature: | 140° C. |
| Flow Rate: | 1.0 ml/min |
| Sample Preparation: | Samples were dissolved in 1,2,4-trichlorobenzene by heating on a rotating wheel for five hours at 150° C. |
| Sample Filtration: | No |
| Sample Concentration: | 4 mg/g |

Preparation of Silica-Supported Aluminoxane (MAO)

Sylopol® XPO-2408 silica, purchased from Grace Davison, was calcined by fluidizing with air at 200° C. for 2 hours and subsequently with nitrogen at 600° C. for 6 hours. 44.6 grams of the calcined silica was added in 100 mL of toluene. 150.7 g of a MAO solution containing 4.5 weight % Al purchased from Albemarle was added to the silica slurry. The mixture was stirred for 1 hour at ambient temperature. The solvent was removed by vacuum, yielding a free flowing solid containing 11.5 weight % Al.

Example 1

Preparation of Catalyst for the First Polymer Component

EtMgBr (100 mL, 3M solution in diethyl ether) was added dropwise to a solution of 4-methoxy-2-tert-butyl-phenol (290 mmol) in tetrahydrofuran (THF) (350 mL) at ambient temperature to give an amber solution. After 2 hours of stirring, toluene (250 mL) was added, and the ether and THF were removed by distillation. Triethylamine (60.6 mL) and paraformaldehyde (21.8 g) were then added as a white slurry in toluene. The reaction was stirred overnight, followed by heating for 2 hours at 95° C. to give a cloudy orange solution. The resulting reaction mixture was poured into 1M HCl while cooling to 0° C. The organic layer was separated and the aqueous phase extracted with diethyl ether. The combined organic phases were dried over $Na_2SO_4$, and then evaporated to give an oily orange material. The oil was dissolved in ethanol (250 mL) and to the clear orange solution was added cyclohexylamine (32.9 mL). The reaction was stirred for 48 hours giving a dark orange solution. The solution was cooled in a freezer causing a yellow crystalline solid to separate. The product was isolated by filtration and washed with cold ethanol. The imine product (54 mmol) was dissolved in THF (200 mL) and added dropwise to a stirring suspension of excess NaH (70 mmol) in THF (250 mL). The yellow suspension was stirred for 48 hours, the excess NaH removed by filtration and the solvent removed to give a bright yellow solid. The sodium salt (46 mmol) was dissolved in THF (150 mL) and added to a suspension of $ZrCl_4 \cdot THF_2$ (23 mmol) in THF (150 mL). The resulting yellow suspension was stirred for 48 hours. The solvent was removed giving impure product as a very sparingly soluble yellow residue. The crude material was extracted with several portions of $CH_2Cl_2$ followed by filtration and solvent removal to give a yellow solid which was further washed with cold $CH_2Cl_2$ether to remove unreacted ligand.

In a glovebox, 2.92 g of silica-supported MAO prepared above was slurried in 25 mL of toluene. Separately, 82 mg of the yellow solid prepared above was dissolved in 15 mL of toluene and the solution was added to the silica-supported MAO slurry. After one hour of stirring, the slurry was filtered, yielding a clear filtrate. The solid component was washed twice with toluene, and once with heptane. The final product was dried in vacuo to 300 mTorr (40 Pa) and stored under nitrogen until used.

Preparation of the First Polymer Component

A 2L stirred Parr reactor was heated at 100° C. for 1 hour and thoroughly purged with argon. The reactor was then cooled to 40° C. 910 mL of n-hexane, 30 mL of 1-hexene and 0.6 mL of a 25.5 weight % of triiso-butyl aluminum in hexanes were added to the reactor. The reactor was then heated to 70° C. Hydrogen from a 150 mL cylinder was added to the reactor such that the pressure drop in the hydrogen cylinder was 30 psia. The reactor was then pressurized with 107 psig ethylene. Argon was used to push 30.9 mg of the supported catalyst prepared above from a tubing into the reactor to start the reaction. During the polymerization, the reactor pressure was maintained constant with 107 psig of ethylene. The polymerization was carried out for 60 minutes, yielding 66.3 g of polymer. The molecular weight characteristics and the GPC-FTIR profile of the resin are shown in Table 1 and FIG. 1, respectively.

Example 2

Preparation of Catalyst for the Second Polymer Component

Sodium cyclopentadiene (615 mmol) was dissolved in tetrahydrofuran and a solution of perfluorobenzene (309 mmol) was added as a 1:1 solution with THF over a 20 minute period. The resulting mixture was for 3 hours at 60° C., allowed to cool, then added by cannula transfer to neat chlorotrimethylsilane (60 mL) at 0° C. over 15 minutes. The reaction was allowed to warm to ambient temperature for 30 minutes, followed by slow concentration over a 3 hour period to remove excess chlorotrimethylsilane and solvents. The resulting wet solid was slurried in heptane and filtered. Concentration of the heptane filtrate gave crude $(TMS)(C_6F_5)C_5H_4$ as a brown oil which was used without further purification. $(TMS)(C_6F_5)C_5H_4$ (78 mmol) was dissolved in THF and cooled to 0° C. The solution was treated with n-BuLi (78 mmol), which was added dropwise. After stirring for 15 minutes at 0° C., the reaction was allowed to warm to ambient temperature and stirred for a further 1 hour. A cold solution of n-propyl bromide (99 mmol) was prepared in THF (50 mL), and to this was added the $[(TMS)(C_6F_5)C_5H_3]Li$ solution. The resulting mixture was stirred for 2 hours and the THF was removed by evaporation under vacuum. The residue was extracted into heptane (150 mL), filtered and the solvent was evaporated. $TiCl_4$ (85 mmol) was added to the $(n-Pr)(TMS)(C_6F_5)C_5H_3$ via pipette and the solution was heated to 60° C. for 3 hours. Removal of excess $TiCl_4$ under vacuum gave a thick oil. Addition of pentane caused immediate precipitation of product $((n-Pr)(C_6F_5)C_5H_3)TiCl_3$ which was isolated by filtration. $((n-Pr)(C_6F_5)C_5H_3)TiCl_3$ (8 mmol) was mixed with $(tBu)_3PN-TMS$ (8 mmol) in toluene and stirred at 50° C. for 1 hour. The solution was concentrated under vacuum and heptane was added to precipitate the desired product which was isolated by filtration.

In a glovebox, 1.96 g of silica-supported MAO prepared above was slurried in 25 mL of toluene. Separately, 43 mg of the catalyst complex prepared above was dissolved in 25 mL of toluene and the solution was added to the silica-supported MAO slurry. After one hour of stirring, the slurry was filtered, yielding a clear filtrate. The solid component was washed twice with toluene, and once with heptane. The final product was dried in vacuo to 300 mTorr (40 Pa) and stored under nitrogen until used.

Preparation of the Second Polymer Component

Figure 2:
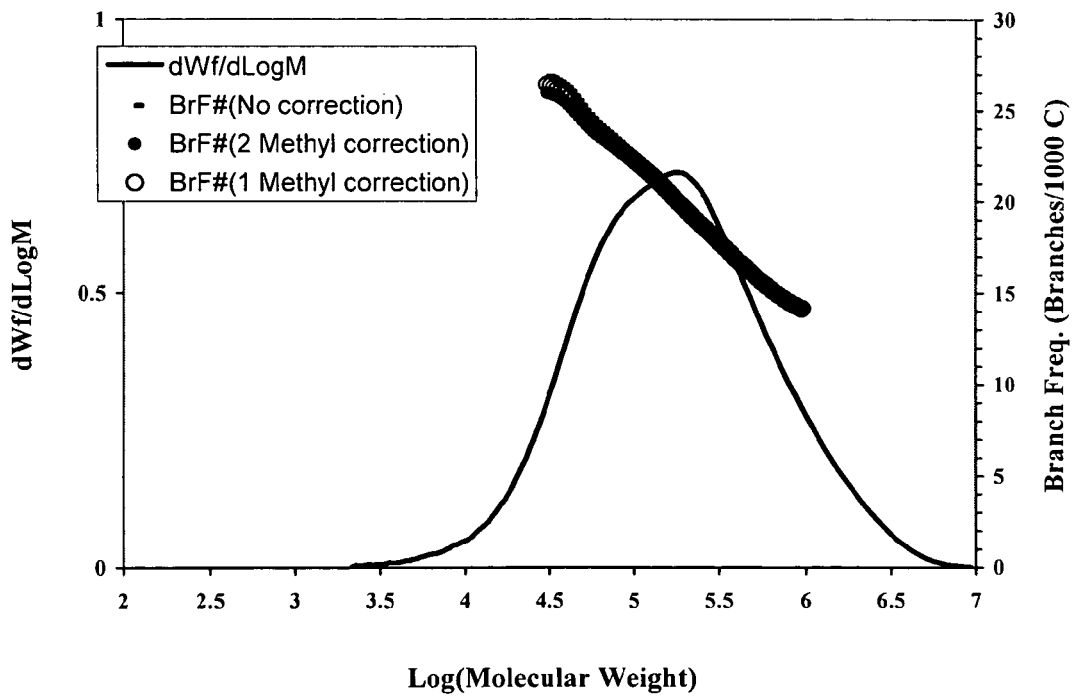
FIG. 2 shows the GPC FTIR profile of the polymer produced in an example using a single site catalyst.

A 2L stirred Parr reactor was heated at 100° C. for 1 hour and thoroughly purged with argon. The reactor was then cooled to 40° C. 910 mL of n-hexane, 30 mL of 1-hexene and 0.6 mL of a 25.5 wt % of triiso-butyl aluminum in hexanes were added to the reactor. The reactor was then heated to 70° C. The reactor was then pressurized with 100 psig ethylene. Argon was used to push 25.6 mg of the supported catalyst prepared above from a tubing into the reactor to start the reaction. During the polymerization, the reactor pressure was maintained constant with 100 psig of ethylene. The polymerization was carried out for 15 minutes, yielding 27.1 g of polymer. The molecular weight characteristics and the GPC-FTIR profile of the resin are shown in Table 2 and FIG. 2, respectively.

Example 3

Preparation of the Blend

Figure 3:
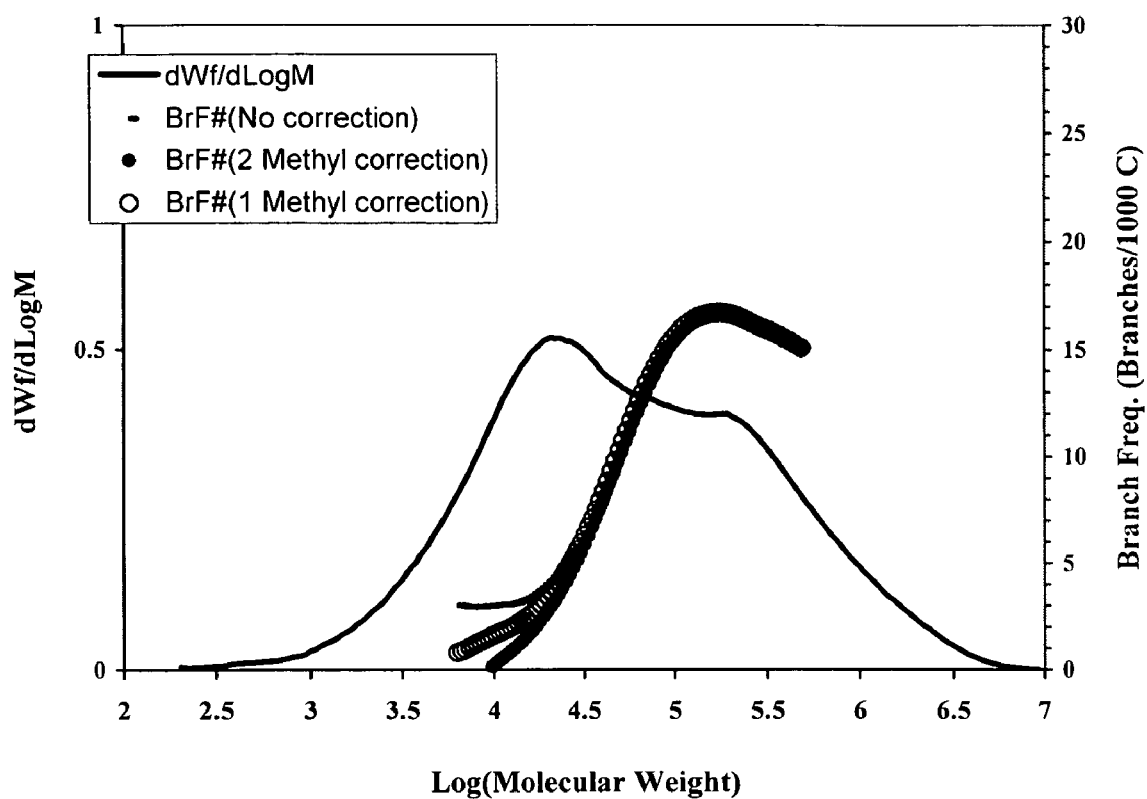
FIG. 3 shows the GPC-FTIR profiles of the polymer blend prepared by mixing the polymers of FIGS. 1 and 2 as a 50:50 blend (weight %).

A blend of the resins produced in Examples 1 and 2 was prepared by solution method although other techniques such as extrusion could be used. An equal amount of the resins produced in Examples 1 and 2 were dissolved together in 1,2,4-trichlorobenzene at 150° C. for 4 to 5 hours. The solution was then injected into a GPC or GPC-FTIR equipment under conditions described in the previous session. As shown in Table 1 and FIG. 3, a bimodal resin was produced with very broad molecular weight distribution and reserve comonomer placement suitable for applications in films, pipes, geomembrane and blow molding.

TABLE 1

Molecular Weight Characteristics of Resins

|  | Mn | Mw | Mz | Mw/Mn |
|---|---|---|---|---|
| Example 1 | 8,800 | 31,100 | 107,400 | 3.5 |
| Example 2 | 108,300 | 353,400 | 944,500 | 3.3 |
| Example 3 | 17,100 | 241,300 | 923,500 | 14.2 |

What is claimed is:
1. A polyolefin post reactor blend comprising:
(a) from 5 to 95 weight % of a polymer having a weight average molecular weight greater than 5,000 comprising from 80 to 100 weight % of ethylene and from 20 to 0 weight % of one or more $C_{3-8}$ alpha olefins having a density greater than 0.930 g/cm³, said copolymer being prepared in the presence of a catalyst of the formula

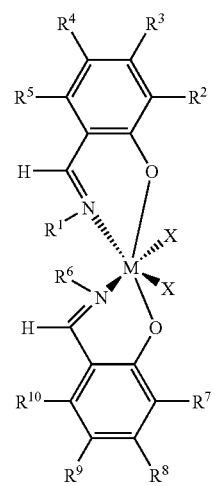

wherein M is a group 4 transition metal; $R^1$ and $R^6$ are independently selected from the group consisting of $C_{6-10}$ alkyl or $C_{6-10}$ aryl radicals; $R^2$ and $R^7$ are independently selected from the group consisting of $C_{3-5}$ secondary or tertiary alkyl radicals; $R^3$, $R^4$, $R^5$, $R^8$, $R^9$ and $R^{10}$ are independently selected from the group consisting of a hydrogen atom, $C_{1-4}$ alkyl radicals, $C_{6-10}$ aryl radicals, $C_1$-$C_4$ alkoxy radicals which substituents have a Hammett $s_r$ value of less than 0.2; and X and X' are selected from the group consisting of a halogen atom, $C_{1-4}$ alkyl radicals, $C_{7-12}$ arylalkyl radicals, $C_{6-10}$ phenoxy radicals, amido radicals which may be substituted by up to two $C_{1-4}$ alkyl radicals and $C_{1-4}$ alkoxy radicals, said catalyst being supported on silica having an average particle size from about 1 to 150 microns, a surface area greater than 10 $m^2/g$, and a pore volume from about 0.3 to 5.0 ml/g, and an activator; and (b) from 95 to 5 weight % of a polymer having a weight average molecular weight greater than 100,000 comprising from 60 to 100 weight % of ethylene and from 40 to 0 weight % of one or more $C_{3-8}$ alpha olefins having a density from 0.890 to 0.950 $g/cm^3$, said copolymer being prepared in the presence of a catalyst of the formula:

$$(L)_n\text{-}M\text{-}(X)_p$$

wherein M is a group 4 metal; L is a monoanionic ligand independently selected from the group consisting of a cyclopentadienyl-type ligand, a bulky heteroatom ligand selected from the group consisting of ketimide ligands, silicon-containing heteroatom ligands, amido lipands, alkoxy ligands, boron heterocyclic ligands, phosphole ligands and a phosphinimine ligand; X is an activatable ligand; n may be from 1 to 3; and p may be from 1 to 3, provided that the sum of n+p equals the valence state of M, and further provided that two L ligands may be bridged by a silyl radical or an alkyl radical, said catalyst being supported on silica having have an average particle size from about 1 to 150 microns, a surface area greater than 10 $m^2/g$, and a pore volume from about 0.3 to 5.0 ml/g, and an activator.

2. The blend according to claim 1, wherein component (a) has a weight average molecular weight from 10,000 to 140,000.

3. The blend according to claim 2, wherein component (b) has a weight average molecular weight from 140,000 to 1,000,000.

4. The blend according to claim 3, wherein component (a) is present in an amount from 30 to 70 weight % of the blend and component (b) is present in an amount from 70 to 30 weight % of the blend.

5. The blend according to claim 4, wherein component (a) comprises 80 to 100 weight % of ethylene and from 20 to 0 weight % of one or more $C_{3-8}$ alpha olefins and component (b) comprises 60 to 100 weight % of ethylene and from 40 to 0 weight % of one or more $C_{3-8}$ alpha olefins.

6. The blend according to claim 5, wherein the activator used to prepare components (a) and (b) is selected from the group consisting of:

(i) a complex aluminum compound of the formula $R^{12}_2AlO(R^{12}AlO)_mAlR^{12}_2$ wherein each $R^{12}$ is independently selected from the group consisting of $C_{1-20}$ hydrocarbyl radicals and m is from 3 to 50, and optionally a hindered phenol to provide a molar ratio of Al:hindered phenol from 2:1 to 5:1 if the hindered phenol is present;

(ii) ionic activators which may be free or tethered to a support said ionic activators selected from the group consisting of:

(A) compounds of the formula $[R^{13}]^+[B(R^{14})_4]^-$ wherein B is a boron atom, $R^{13}$ is a cyclic $C_{5-7}$ aromatic cation or a triphenyl methyl cation and each R14 is independently selected from the group consisting of phenyl radicals which are unsubstituted or substituted with 3 to 5 substituents selected from the group consisting of a fluorine atom, a $C_{1-4}$ alkyl or alkoxy radical which is unsubstituted or substituted by a fluorine atom; and a silyl radical of the formula —Si-$(R^{15})_3$; wherein each $R^{15}$ is independently selected from the group consisting of a hydrogen atom and a $C_{1-4}$ alkyl radical; and (B) compounds of the formula $[(R^{18})_tZH]^{30}$ $[B(R^{14})_4]^-$ wherein B is a boron atom, H is a hydrogen atom, Z is a nitrogen atom or phosphorus atom, t is 2 or 3 and $R^{18}$ is selected from the group consisting of $C_{1-8}$ alkyl radicals, a phenyl radical which is unsubstituted or substituted by up to three $C_{1-4}$ alkyl radicals, or one $R^{18}$ taken together with the nitrogen atom may form an anilinium radical and $R^{14}$ is as defined above; and (C) compounds of the formula $B(R^{14})_3$ wherein $R^{14}$ is as defined above; and (iii) mixtures of (i) and (ii).

7. A pipe prepared from the blend according to claim 1.

8. A geomembrane prepared from the blend according to claim 1.

9. A blown film prepared from the blend according to claim 1.

10. A cast film prepared from the blend according to claim 1.

11. An injection molded article prepared from the blend according to claim 1.

12. A blow molded article prepared from the blend according to claim 1.

13. A rotomolded article prepared from the blend according to claim 1.

\* \* \* \* \*